(12) United States Patent
Jeong et al.

(10) Patent No.: US 11,436,150 B2
(45) Date of Patent: Sep. 6, 2022

(54) METHOD FOR PROCESSING PAGE FAULT BY PROCESSOR

(71) Applicants: RESEARCH & BUSINESS FOUNDATION SUNGKYUNKWAN UNIVERSITY, Gyeonggi-do (KR); SEOUL NATIONAL UNIVERSITY R&DB FOUNDATION, Seoul (KR)

(72) Inventors: Jinkyu Jeong, Suwon-si (KR); Jae Wook Lee, Seoul (KR); Gyusun Lee, Suwon-si (KR); Wenjing Jin, Seoul (KR); Tae Jun Ham, Seoul (KR)

(73) Assignees: Research & Business Foundation Sungkyunkwan University, Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/950,370

(22) Filed: Nov. 17, 2020

(65) Prior Publication Data
US 2021/0374063 A1 Dec. 2, 2021

(30) Foreign Application Priority Data
May 29, 2020 (KR) ......................... 10-2020-0065330

(51) Int. Cl.
*G06F 12/0882* (2016.01)
*G06F 9/30* (2018.01)
(Continued)

(52) U.S. Cl.
CPC ...... *G06F 12/0882* (2013.01); *G06F 9/30101* (2013.01); *G06F 11/1068* (2013.01);
(Continued)

(58) Field of Classification Search
CPC ............ G06F 9/30101; G06F 11/1068; G06F 11/3037; G06F 12/0238; G06F 12/0882;
(Continued)

(56) References Cited

U.S. PATENT DOCUMENTS 7,953,953 B2   5/2011   In et al.
8,307,191 B1   11/2012  Jain
(Continued)

FOREIGN PATENT DOCUMENTS

CN   106598483 A   4/2017
JP   2020-9492 A   1/2020
(Continued)

OTHER PUBLICATIONS

Gyusun Lee et al., "A Case for Hardware-Based Demand Paging", 2020 ACM/IEEE 47th Annual International Symposium on Computer Architecture (ISCA), 2020, p. 1103-1116.
(Continued)

*Primary Examiner* — Aracelis Ruiz
(74) *Attorney, Agent, or Firm* — NSIP Law

(57) ABSTRACT

Disclosed is a method for processing a page fault. The method includes performing demand paging depending on an application operation in a system including a processor and an operating system, and loading, at the processor, data on a memory in response to the demand paging.

12 Claims, 11 Drawing Sheets

(51) Int. Cl.
  *G06F 11/10* (2006.01)
  *G06F 11/30* (2006.01)
  *G06F 12/02* (2006.01)
  *G06F 12/1081* (2016.01)
  *G06F 12/123* (2016.01)

(52) U.S. Cl.
  CPC ...... *G06F 11/3037* (2013.01); *G06F 12/0238* (2013.01); *G06F 12/1081* (2013.01); *G06F 12/123* (2013.01); *G06F 2212/1021* (2013.01)

(58) Field of Classification Search
  CPC ............. G06F 12/1009; G06F 12/1081; G06F 12/123; G06F 2212/1021; G06F 2212/1024
  See application file for complete search history.

(56) References Cited

U.S. PATENT DOCUMENTS

| | | | |
|---|---|---|---|
| 9,281,491 | B2 | 3/2016 | Kum et al. |
| 9,346,090 | B2 | 5/2016 | Cramer et al. |
| 9,792,220 | B2 | 10/2017 | Buschardt et al. |
| 10,558,580 | B2 | 2/2020 | Petkov et al. |
| 2006/0277389 | A1* | 12/2006 | Hepkin ............... G06F 12/1027 711/203 |
| 2012/0036334 | A1* | 2/2012 | Horman ................ G06F 9/52 711/165 |
| 2018/0046378 | A1* | 2/2018 | Coburn ............... G06F 12/1009 |
| 2018/0157597 | A1 | 6/2018 | Maxey et al. |
| 2019/0220418 | A1* | 7/2019 | Chen .................. G06F 12/0882 |

FOREIGN PATENT DOCUMENTS

| | | |
|---|---|---|
| KR | 10-2007-0068801 A | 7/2007 |
| KR | 10-2012-0138237 A | 12/2012 |
| KR | 10-2014-0035146 A | 3/2014 |
| KR | 10-2014-0112264 A | 9/2014 |
| KR | 10-2015-0003306 A | 1/2015 |
| KR | 10-2015-0080217 A | 7/2015 |
| KR | 10-2019-0067088 A | 6/2019 |

OTHER PUBLICATIONS

Extended European Search Report dated May 12, 2021 issued in corresponding European Appln. No. 20208142.8.
Korean Office Action dated Sep. 8, 2021, in counterpart Korean Patent Application No. 10-2020-0065330 (5 pages in Korean).
Korean Office Action dated Feb. 18, 2022, in counterpart Korean Patent Application No. 10-2020-0065330 (5 pages in Korean).

* cited by examiner

FIG. 4

| SID | Dev. ID | Logical Block Address | Protection Bits | 1 | 0 |
|---|---|---|---|---|---|

LBA Bit Present Bit

| 63 | 47 | 31 | 15 |
|---|---|---|---|
| Submission Queue (SQ) Address ||||
| Completion Queue (CQ) Address ||||
| Submission Queue (SQ) Doorbell Address ||||
| Completion Queue (CQ) Doorbell Address ||||
| SQ-tail | CQ-head | CQ-phase | Depth |
| Namespace ID | Unused |||

(a) Throughput (b) User-level microarchitectural events

METHOD FOR PROCESSING PAGE FAULT BY PROCESSOR

CROSS-REFERENCE TO RELATED APPLICATIONS

This application claims priority under 35 U.S.C. § 119 to Korean Patent Application No. 10-2020-0065330 filed on May 29, 2020, in the Korean Intellectual Property Office, the disclosures of which are incorporated by reference herein in their entireties.

BACKGROUND

Embodiments of the inventive concept described herein relate to a method for processing a page fault by a processor.

In a computer system environment using a page-based virtual memory technique, nowadays, a demand paging technique is widely used to efficiently use a memory. In a conventional demand paging technique, demand paging is generated based on the content of a page table entry corresponding to a virtual address to which the demand paging is to be applied.

Meanwhile, additional information (e.g., a swap offset) may be stored in a free bit space of the page table entry if necessary. In this case, a processor (e.g., a central processing unit (CPU)) may fail to parse the additional information, and only an operating system may parse the additional information. Accordingly, when a page fault occurs, the processor operates based on an exception handling routine defined in advance by the operating system, and the operating system checks validity of a virtual address where the page fault occurs. In the case of a virtual address of a valid region, the operating system performs an operation of loading data corresponding to a relevant address.

In the case where an input/output (I/O) speed of a storage device is slow, the operating system-based demand paging technique described above does not greatly affect the whole page fault delay. However, as a speed of a storage device becomes higher, nowadays, the influence of a delay time, which comes from page fault processing in the operating system, of the whole page fault delay increases.

SUMMARY

Embodiments of the inventive concept provide a method capable of shortening a time taken to access data of a storage device in a paging process by directly processing a page fault through hardware such as a processor and capable of reducing resource pollution in a processor, which comes from demand paging processing in an operating system.

The inventive concept provides a method for processing a page fault. The method includes performing demand paging depending on an application operation in a system including a processor and an operating system, and loading, at the processor, data on a memory in response to the demand paging.

According to an embodiment, the loading of the data on the memory includes looking up, at a memory management unit constituting the processor, a page table, checking a present bit of a page table entry, checking a logical block address (LBA) bit of the page table entry when the present bit corresponds to a first value determined in advance, and processing the page fault through a fault processing unit constituting the processor when the LBA bit corresponds to a second value determined in advance.

According to an embodiment, the processing of the page fault includes transferring information associated with the page fault to a page miss handler constituting the fault processing unit, looking up page miss status holding registers (PMSHR) based on the information associated with the page fault, allocating a page for processing the page fault based on information stored in the PMSHR, updating, at the page miss handler, the page table entry, and transferring, at the page miss handler, a page fault processing completion message to the memory management unit According to an embodiment, the method further includes, after the allocating of the page for processing the page fault, transferring, at the page miss handler, an I/O request to a host control unit, processing, at the host control unit, an I/O through a queue register, and transferring, at the host control unit, an I/O completion message to the page miss handler.

According to an embodiment, the method further includes snooping, at the host control unit, a head address of a completion queue with regard to the I/O request and checking whether to transfer the I/O completion message to the page miss handler.

According to an embodiment, the page table entry includes information associated with the present bit, information associated with the LBA bit, information associated with a socket identifier (ID), information associated with a device ID, and information associated with a logical block address.

According to an embodiment, the method further includes returning a page frame number when the present bit corresponds to a third value determined in advance, calling an operating system page fault handler when the LBA bit corresponds to a fourth value determined in advance, allocating a page from an operating system memory allocator, inserting the page into a page cache, and transferring an I/O request through a device driver and updating the page table entry upon I/O completion.

According to an embodiment, the method further includes calling, at the operating system, a kernel thread periodically, allocating, at an operating system memory allocator, a page, performing direct memory access (DMA) mapping of the allocated page, and refilling a free page by inserting the allocated page into a free page queue.

According to an embodiment, the method further includes looking up, at the operating system, the page table periodically, checking, at the operating system, an LBA bit of a page middle directory (PMD) entry and an LBA bit of a page upper directory (PUD) entry, checking, at the operating system, the LBA bit and the present bit of the page table entry, inserting a page corresponding to the page table entry into a cache or a least recently used (LRU) list based on the LBA bit and the present bit, and updating page-related meta data.

The inventive concept provides a processor for processing a page fault. The processor includes a memory management unit that looks up a page table and checks a present bit of a page table entry, wherein, when the present bit corresponds to a first value determined in advance, the memory management unit checks a logical block address (LBA) bit of the page table entry, and a fault processing unit that processes the page fault when the LBA bit corresponds to a second value determined in advance.

According to an embodiment, the fault processing unit includes a page miss handler that receives information associated with the page fault, looks up page miss status holding registers (PMSHR) based on the information associated with the page fault, allocates a page for processing the page fault based on information stored in the PMSHR, updates the page table entry, and transfers a page fault processing completion message to the memory management unit.

According to an embodiment, the fault processing unit further includes a host control unit that receives an I/O request from the page miss handler, processes an I/O through a queue register, and transfers an I/O completion message to the page miss handler.

According to an embodiment, the host control unit snoops a head address of a completion queue with regard to the I/O request and checks whether to transfer the I/O completion message to the page miss handler.

According to an embodiment, the page table entry includes information associated with the present bit, information associated with the LBA bit, information associated with a socket identifier (ID), information associated with a device ID, and information associated with a logical block address.

BRIEF DESCRIPTION OF THE FIGURES

The above and other objects and features of the inventive concept will become apparent by describing in detail exemplary embodiments thereof with reference to the accompanying drawings.

FIG. 4 is a diagram illustrating a structure of a page table entry according to an embodiment of the inventive concept.

DETAILED DESCRIPTION

While the inventive concept is susceptible to various modifications and alternative forms, specific embodiments will be described with reference to drawings in detail. It should be understood, however, that there is no intent to limit the invention to the particular forms disclosed, but on the contrary, the invention is to cover all modifications, equivalents, and alternatives falling within the spirit and scope of the invention. Similar reference signs or numerals may be used for similar elements in describing drawings.

Although the terms "first", "second", etc. may be used herein in reference to various components, such components should not be construed as being limited by these terms. These terms are only used to distinguish one element from the other. For example, without departing from the spirit and scope of the inventive concept, a first element may be referred to as a second element, and similarly, a second element may be referred to as a first element. The term "and/or" includes a combination of a plurality of relevant listed elements or components or one of a plurality of relevant listed elements or components.

It will be understood that when an element is referred to as being "connected" or "coupled" to any other element(s), it can be directly connected or coupled to the other element(s) or intervening elements may be present. In contrast, when an element is referred to as being "directly connected" or "directly coupled" to any other element(s), there are no intervening elements.

The terminology used herein to describe embodiments is not intended to limit the inventive concept. The articles "a," "an," and "the" are singular in that they have a single referent, however, the use of the singular form in the specification should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Furthermore, unless otherwise defined, all terms including technical and scientific terms used herein are to be interpreted as is customary in the art to which the inventive concept belongs. It will be understood that terms used herein should be interpreted as having a meaning that is consistent with their meaning in the context of the specification and the relevant art and will not be interpreted in an idealized or overly formal sense unless expressly so defined herein.

In the specification and all the claims, unless otherwise defined, the description that a portion includes any other element means that any other element may be further included, not excluding the presence or addition of one or more other elements and/or components.

Figure 1:
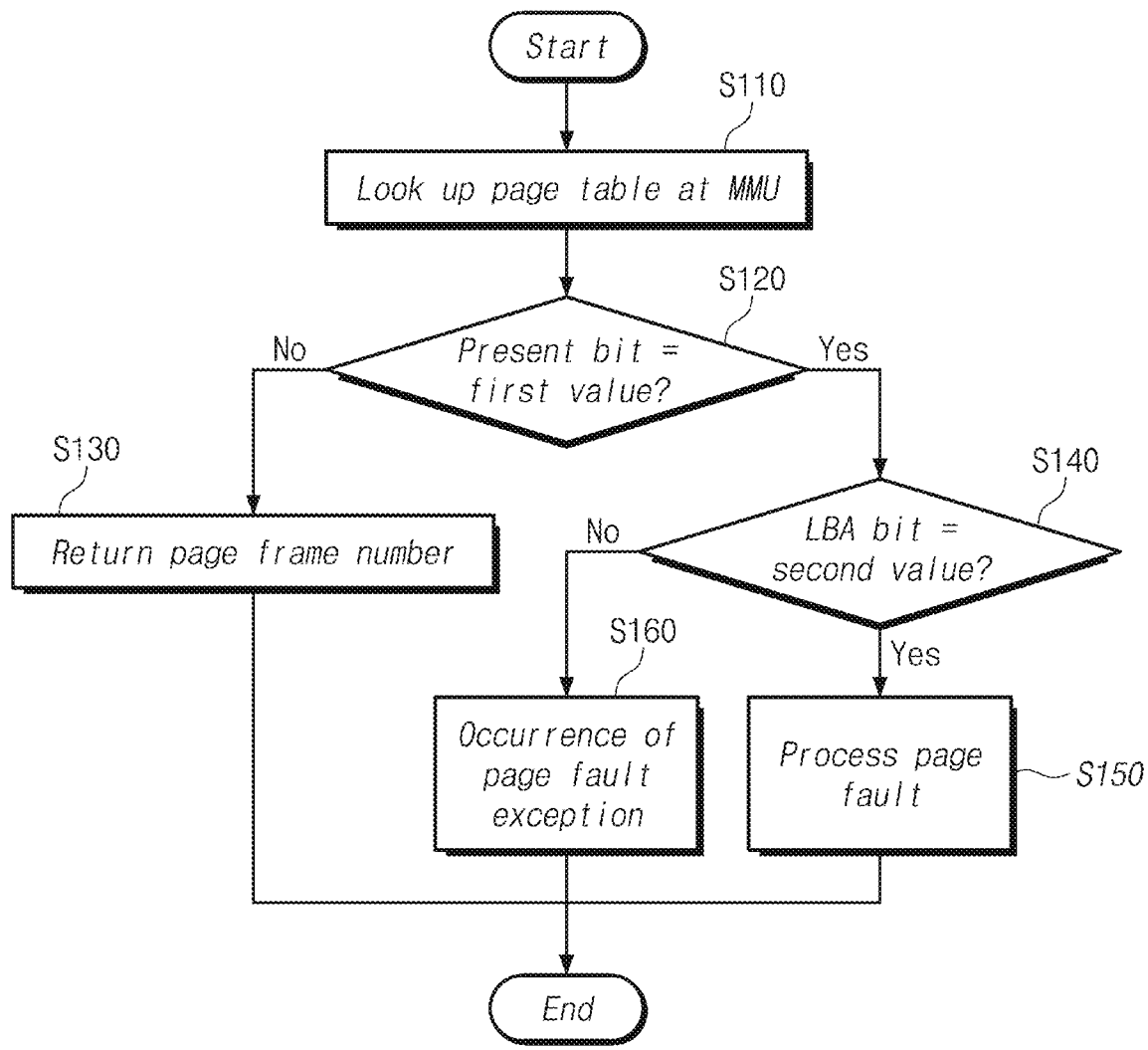
FIG. 1 is a flowchart illustrating a method for processing a page fault, according to an embodiment of the inventive concept.

FIG. 1 is a flowchart illustrating a method for processing a page fault, according to an embodiment of the inventive concept. According to an embodiment, the flowchart shown in FIG. 1 may be performed by a processor illustrated in FIG. 12.

According to an embodiment, the processor may access a virtual memory when a specific application is being executed and may look up a page table at a memory management unit, in operation S110. According to various embodiments, in operation S120, the processor may determine whether a present bit included in a page table entry corresponds to a first value determined in advance. For example, the first value may be "0". A detailed structure of the page table entry will be described with reference to FIG. 4.

According to an embodiment, the present bit may indicate whether there is a physical memory corresponding to a virtual address. When the present bit does not correspond to the first value (e.g., when the present bit is "1"), the physical memory corresponding to the virtual address may exist (i.e., a page fault may not occur); in operation S130, the processor may return a page frame number. According to various embodiments, when the present bit corresponds to the first value (e.g., when the present bit is "0"), the physical memory corresponding to the virtual address may not exist (i.e., a page fault may occur), and an additional operation for processing the page fault may be required. For example, in operation S140, the processor may determine whether a logical block address (LBA) bit corresponds to a second value. For example, the second value may be "1".

According to an embodiment, the LBA bit may indicate whether a page fault is processed in a hardware manner or in a software manner. When the LBA bit corresponds to the second value (e.g., when the LBA bit is "1"), in operation S150, the processor may directly process the page fault. That is, the page fault may be processed in the hardware manner. According to various embodiments, when the LBA bit does not correspond to the second value (e.g., when the LBA bit is "0"), in operation S160, it may be determined that page fault exception occurs, and the page fault may be processed through an operating system. That is, the page fault may be processed in the software manner. Operation S150 will be more fully described with reference to FIG. 2, and operation S160 will be more fully described with reference to FIG. 3.

Figure 2:
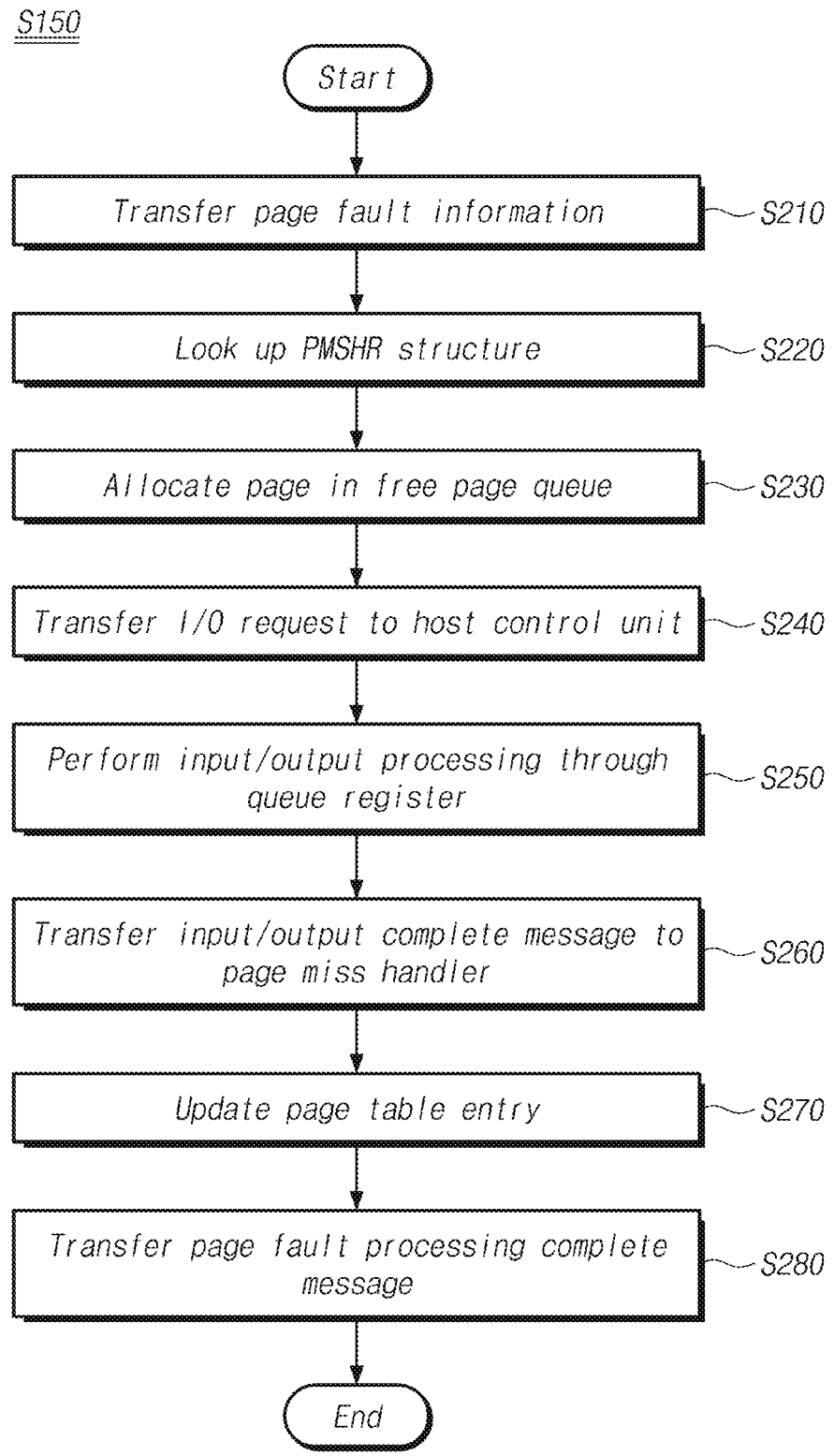
FIG. 2 is a flowchart illustrating a page fault processing method of a processor, according to an embodiment of the inventive concept.

FIG. 2 is a flowchart illustrating a page fault processing method of a processor, according to an embodiment of the inventive concept. Referring to FIG. 2, page fault processing according to operation S150 of FIG. 1 is in detail implemented. As described above, the page fault processing according to operation S150 of FIG. 1 may be performed when the present bit is of the first value and the LBA bit is of the second value (i.e., when the page fault is processed in a hardware manner). According to an embodiment, the flowchart shown in FIG. 2 may be performed by the processor illustrated in FIG. 12.

According to an embodiment, in operation S210, the processor may transfer page fault information to a page miss handler. For example, when it is determined that the LBA bit has the second value, the processor such as a CPU core may stall the execution of a pipeline and may transfer an I/O request through the page miss handler and a host control unit. Depending on the I/O request, data may be transferred from a high-capacity storage device (e.g., a solid state drive (SSD)) to a memory.

In detail, the processor may transfer LBA information in the page table entry and a page table entry address to the page miss handler. According to various embodiments, in operation S220, the processor may look up a page miss status holding registers (PMSHR) structure.

According to an embodiment, as a table that stores information associated with a page fault (or a page miss) being currently processed, the PMSHR may be implemented with registers and may be a kind of content addressable memory. According to various embodiments, each entry of the PMSHR may include the following values.

PTE (page table entry) address: An address where a PTE value associated with a page fault to be processed is stored, which is used to update the PTE value after processing the page fault.
PMD (page middle directory) address: Upper-level entry address of a PTE associated with a page fault to be processed.
PUD (page upper directory) address: Upper-level entry address of a PMD associated with a page fault to be processed.
Device ID: Include an index of a storage device, in which a relevant page fault is to be processed, as an index value in a fault processing unit constituting the processor.
LBA: Mean an address of a storage device to be accessed with respect to a relevant page fault.
PFN (page frame number): Mean a page frame number of a page allocated for an I/O request, as information used to update a PTE value after a relevant page fault is processed.

According to an embodiment, each entry of the PMSHR may include only one entry with respect to the same page fault and may perform one I/O operation associated with a storage device for each page fault. According to various embodiments, in the case where a page fault occurs at a plurality of CPU cores with regard to the same virtual address, an entry may be generated in the PMSHR only when the first page fault occurs, and an entry may not be additionally generated when a page fault associated with the same virtual address occurs later.

That is, even though a plurality of page faults occur with regard to the same virtual address, redundant entries may not be generated in the PMSHR, but only one entry may be generated. In this case, an I/O request may be made only by the first page fault, and the following page fault(s) may be processed together by the I/O request corresponding to the first page fault. Accordingly, an issue such as a page alias may not occur, and a plurality of I/O requests associated with the same page may not be made. This may mean that the I/O overhead decreases.

According to an embodiment, in operation S230, the processor may allocate a page in a free page queue. According to various embodiments, in operation S240, the processor may transfer the I/O request to the host control unit. For example, the host control unit may be a nonvolatile memory express (NVMe) host control unit.

According to an embodiment, in operation S250, the processor may perform I/O processing through a queue register. According to various embodiments, in operation S250, the processor may perform I/O processing through an NVMe queue descriptor register.

According to an embodiment, in operation S260, the processor may transfer an I/O completion message to the page miss handler; in operation S270, the page miss handler may update the page table entry. According to various embodiments, in operation S280, the page miss handler may transfer a page fault processing completion message to a memory management unit.

Figure 3:
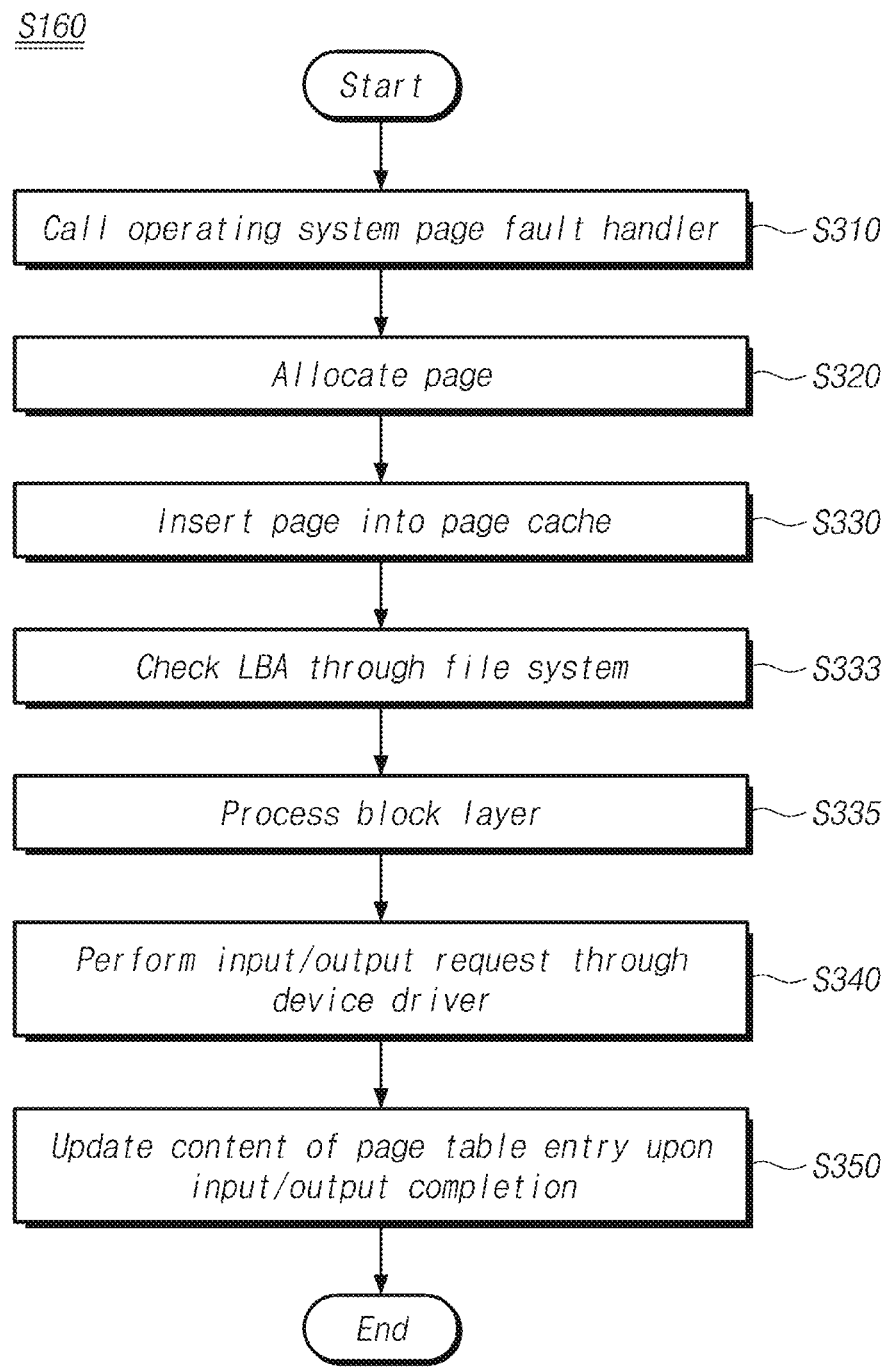
FIG. 3 is a flowchart illustrating a page fault processing method of an operating system, according to an embodiment of the inventive concept.

FIG. 3 is a flowchart illustrating a page fault processing method of an operating system, according to an embodiment of the inventive concept. According to an embodiment, the flowchart shown in FIG. 3 may be performed by the operating system.

According to an embodiment, when it is determined in operation S160 of FIG. 1 that the page fault exception occurs, in operation S310, the operating system may call an operating system page fault handler. According to various embodiments, in operation S320, the operating system may allocate a page from an operating system memory allocator.

According to an embodiment, the operating system may insert the page allocated in operation S330 into a page cache or a least recently used (LRU) list. According to various embodiments, in operation S333, the operating system may check an LBA through a file system; in operation S335, the operating system may process a block layer.

According to an embodiment, in operation S340, the operating system may perform an I/O request through a device driver; in operation S350, the operating system may update the content of the page table entry upon I/O completion. For example, the device driver may be an NVMe device driver.

FIG. 4 is a diagram illustrating a structure of a page table entry according to an embodiment of the inventive concept. According to an embodiment, for the processor to directly process a page fault, a page table entry structure may be implemented as illustrated in FIG. 4.

According to an embodiment, when the present bit is "0" and the LBA bit is "1", the processor may directly process a page fault by utilizing a value of an upper bit (e.g., an SID or Dev.ID) of the page table entry, without generating page fault exception. According to various embodiments, when the present bit is "1", a value of the upper bit (e.g., an SID or Dev.ID) may be managed by the operating system.

According to an embodiment, the SID (i.e., a socket ID) may mean a number of a processor that will process a page fault. According to various embodiments, the Dev.ID may mean a number of a storage device, in which relevant data are stored, when a page fault that the processor will process occurs. A logical block address may mean a logical address on a storage device where data of a relevant page are stored, and the logical address may be used to transfer a storage I/O command later.

According to an embodiment, when performing memory mapping, the operating system may record storage device information (e.g., an SID and a Dev.ID) of a relevant page and information (e.g., an LBA) associated with a location of the relevant page in a storage device at a page table entry of each page. According to various embodiments, when a relevant virtual address is translated through the memory management unit of the processor by setting the present bit to "0" and the LBA bit to "1", the fault processing unit may transfer information of a relevant page table entry to process a page fault.

Figures 5, 6:
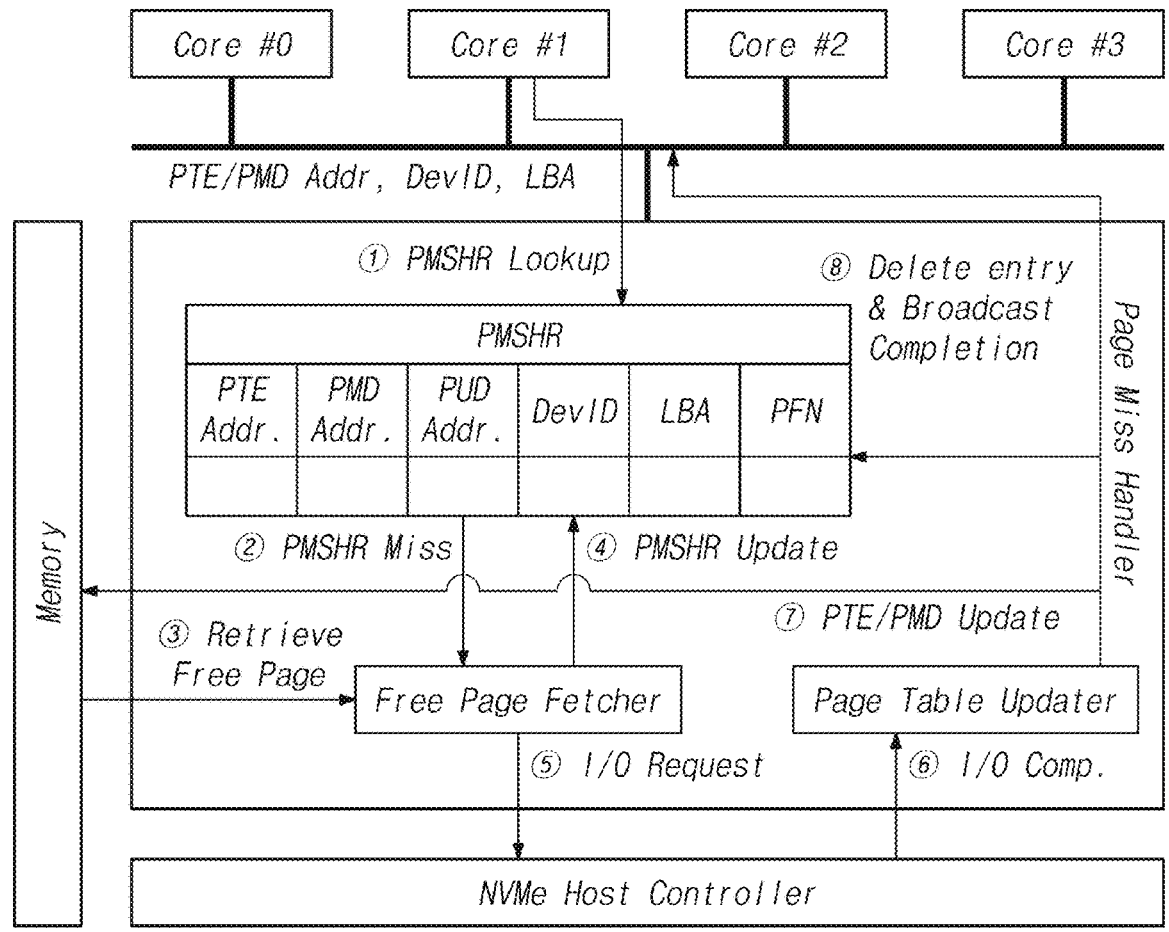
FIG. 5 is a diagram illustrating a structure of a queue register according to an embodiment of the inventive concept.
FIG. 6 is a diagram for describing an operation of a page miss handler according to an embodiment of the inventive concept.

FIG. 5 is a diagram illustrating a structure of a queue register according to an embodiment of the inventive concept.

According to an embodiment, the host control unit may be a storage device based on an NVMe protocol. According to various embodiments, for processing of the NVMe protocol, the fault processing unit may include a queue register as illustrated in FIG. 5. FIG. 5 shows information corresponding to one device. However, a plurality of queue registers that have the same structure as the queue register of FIG. 5 may be provided depending on the number of devices. However, the inventive concept is not limited thereto. For example, a storage device according to an embodiment of the inventive concept may operate based on various protocols, such as a PCI express (PCIe) protocol, a universal flash storage (UFS) protocol, a serial ATA (SATA) protocol, and a serial attached SCSI (SAS) protocol, in addition to the NVMe protocol.

FIG. 6 is a diagram for describing an operation of a page miss handler according to an embodiment of the inventive concept. According to an embodiment, operations shown in FIG. 6 may be performed by the page miss handler illustrated in FIG. 12.

According to an embodiment, when a page fault occurs, the processor may look up the PMSHR (① in FIG. 6). When the occurred page fault is determined as a new page fault, a PMSHR entry may be allocated for the processor (② in FIG. 6). According to various embodiments, the PMSHR entry may be generated based on necessary information received from the memory management unit of the processor, at which the page fault occurs. A PFN disclosed in FIG. 6 may mean a number of a page frame to contain data when a relevant page fault is processed.

According to an embodiment, the processor may in advance secure free pages for containing relevant data in processing a new page fault, as much as a given amount. According to various embodiments, the processor may secure a given amount of free pages corresponding to a free page queue, and the operating system may add a new free page to the free page queue. In this case, the processor may retrieve one free page from the free page queue and may use the retrieved free page to process a page fault (③ in FIG. 6). Here, a page frame number of a page to be used is recorded at the PMSHR entry allocated in the process of ② in FIG. 6 (④ in FIG. 6).

According to an embodiment, after the PMSHR entry associated with the new page fault is generated, an I/O request for a storage device may be transferred to the host control unit (⑤ of FIG. 6). According to various embodiments, in this case, a direct memory access (DMA) address, an LBA, and index information in the PMSHR entry may be transferred for the I/O request.

According to an embodiment, the host control unit may transfer a command ID value of an NVMe command to the page miss handler with regard to the completed I/O (⑥ in FIG. 6). According to various embodiments, the memory management unit may perform address translation by setting an upper bit of the page table entry to "PFN" and the present bit to "1" (⑦ in FIG. 6). Also, LBA bits of a PMD entry and a PUD entry may be set to "1" so as to be utilized in post-processing of the demand paging later. This will be described with reference to FIG. 8B.

According to an embodiment, a completion message may be transferred to the memory management unit that waits for processing completion of the page fault (⑧ in FIG. 6). According to various embodiments, when receiving the message, the memory management unit may again perform the stalled address translation to resume command execution.

According to an embodiment, the PMSHR may transfer the completion message to the memory management unit and may then initialize a value of a relevant PMSHR entry. According to various embodiments, the operations ① to ⑤ of FIG. 6 constitute a process that is performed every page fault request, and the operations ⑥ to ⑧ constitute a process that is performed by the host control unit every I/O completion. Accordingly, the operations ① to ⑤ and the operations ⑥ to ⑧ may be performed asynchronously. That is, there is no need to perform the operations (or process) ⑥ to ⑧ after the operations (or process) ① to ⑤ are performed.

As described above, for better understanding, the operation of the page miss handler is described based on the NVMe protocol, but the inventive concept is not limited thereto. For example, the page miss handler may operate based on various protocols such as a PCI express (PCIe) protocol, a universal flash storage (UFS) protocol, a serial ATA (SATA) protocol, and a serial attached SCSI (SAS) protocol, and one skilled in the art may change the design of the page miss handler such that an appropriate different protocol is applied thereto, without departing from the technical idea of the inventive concept.

Figure 7:
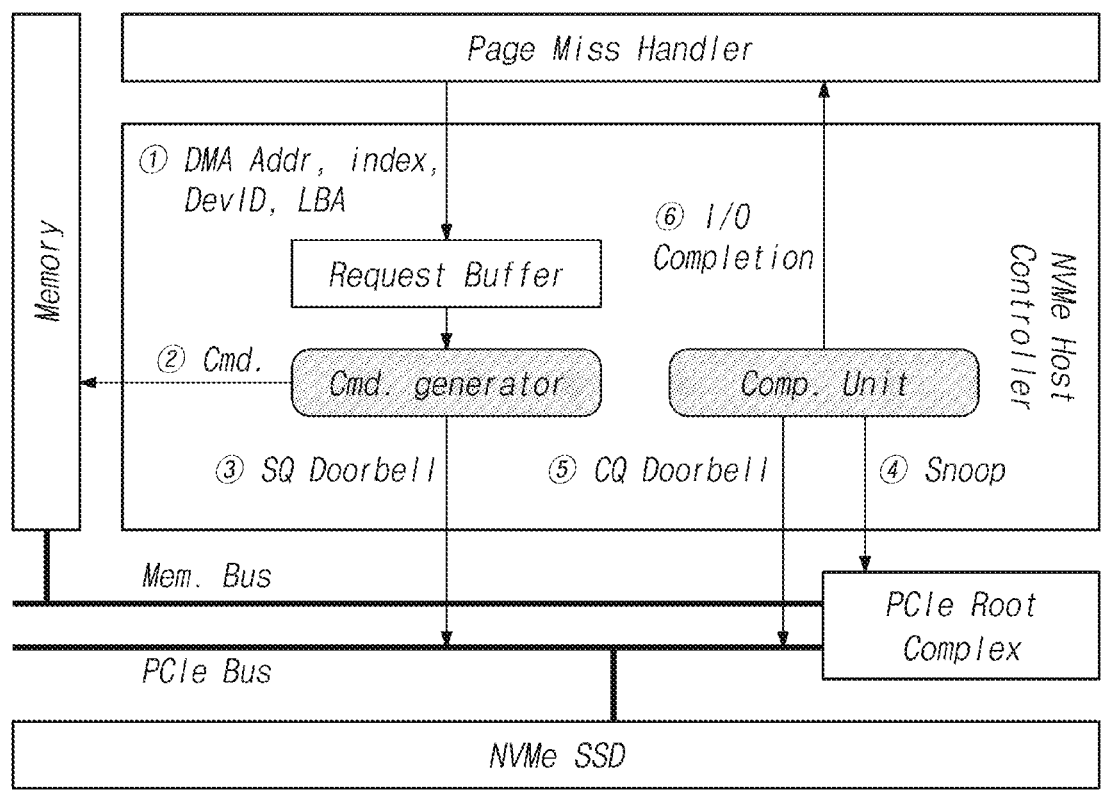
FIG. 7 is a diagram for describing an operation of a host control unit according to an embodiment of the inventive concept.

FIG. 7 is a diagram for describing an operation of a host control unit according to an embodiment of the inventive concept. According to an embodiment, operations shown in FIG. 7 may be performed by the host control unit illustrated in FIG. 12.

According to an embodiment, the host control unit may perform the following functions: transferring an I/O command to an actual storage device with regard to an I/O requested from the page miss handler, receiving an I/O completion message from the storage device, and transferring the I/O completion message to the page miss handler. According to various embodiments, the host control unit may communicate with an NVMe-based storage device and may process the NVMe protocol.

According to various embodiments, an I/O request may be received from the page miss handler (①  in FIG. 7). According to various embodiments, the I/O request may include a DMA address, an LBA, a device ID, and an index value of a PMSHR entry as parameters.

According to an embodiment, after a SQ address for communication with an NVMe device and a command loading location are determined through the device ID, an NVMe read command may be generated and may be written at a location of "SQ address+SQ tail" (② in FIG. 7). In this case, a command ID of the NVMe read command may be set as an index value of a PMSHR entry. According to various embodiments, as the last step of transferring the I/O command, a value of a SQ doorbell may be updated to notify the storage device that a new I/O command arrives (③ in FIG. 7).

According to an embodiment, the host control unit may snoop a memory transaction generated at a PCI root complex and may detect a memory write operation performed with a location of "CQ address+CQ head" (④ in FIG. 7). According to various embodiments, when an I/O completion message is received, a CQ doorbell value may be updated in compliance with the NVMe protocol (⑤ in FIG. 7).

According to an embodiment, a command ID value may be extracted from the I/O completion message and may be transferred to the page miss handler for post-processing of a page fault (⑥ in FIG. 7).

Post-processing for page allocation and demand paging may be required to perform and complete the hardware-based demand paging, which requires the support of the operating system.

According to an embodiment, as the number of entries of the free page queue continuously decreases, a page refill operation accompanying both page allocation and DMA mapping may be required. According to various embodiments, in the case where the free page queue is empty, a request may be made for the operating system to perform the overall page fault processing, and the operating system may perform a queue entry refill operation. To refill a queue entry, a page refill kernel thread may be generated in an initial setting step of the free page queue, and the page refill kernel thread may be configured to operate in a kernel background.

According to an embodiment, the post-processing of the demand paging technique may include the following operations: inserting of an I/O request page into a page cache, page reverse mapping, updating of a page table entry, and the like. According to various embodiments, because the operations require various structures implemented based on the operating system, the support of the operating system may be indispensable.

As described above, for better understanding, the operation of the host control unit is described based on the NVMe protocol, but the inventive concept is not limited thereto. For example, the host control unit may operate based on various protocols such as a PCI express (PCIe) protocol, a universal flash storage (UFS) protocol, a serial ATA (SATA) protocol, and a serial attached SCSI (SAS) protocol, and one skilled in the art may change the design of the host control unit such that an appropriate different protocol is applied thereto, without departing from the technical idea of the inventive concept.

Meanwhile, a demand paging post-processing method according to the inventive concept will be described with reference to FIGS. 8A and 8B.

Figure 8A:
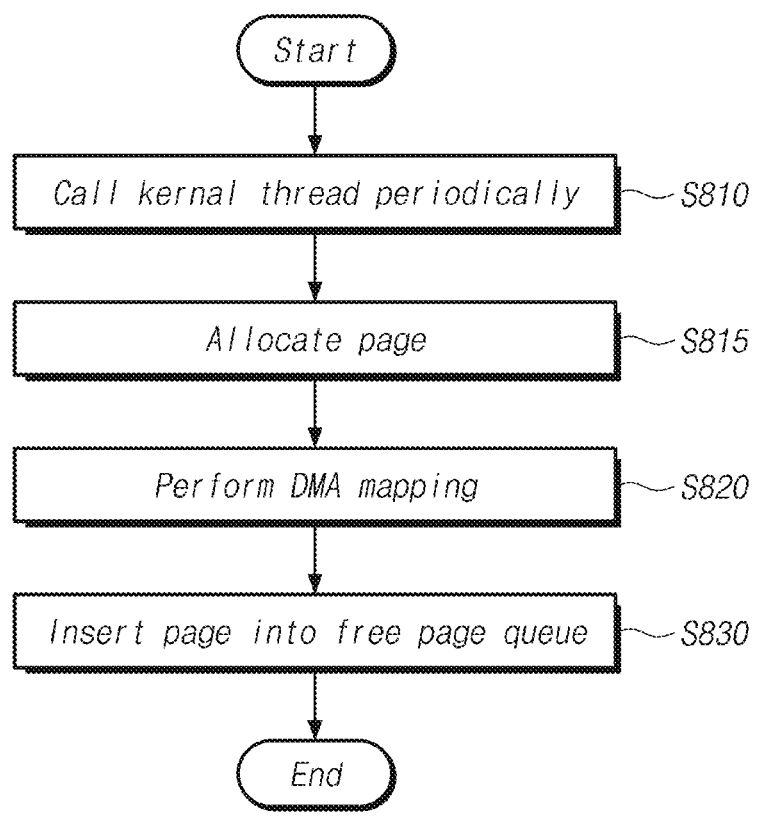
FIG. 8A is a diagram for describing a page allocation kernel thread according to an embodiment of the inventive concept.

FIG. 8A is a diagram for describing a page allocation kernel thread according to an embodiment of the inventive concept. According to an embodiment, the flowchart shown in FIG. 8A may be performed by the operating system illustrated in FIG. 12.

According to an embodiment, in operation S810, the operating system may periodically call a kernel thread, and in operation S815, a page may be allocated from an operating system memory allocator. According to various embodiments, in operation S820, the operating system may perform DMA mapping on the allocated page, and in operation S830, the operating system may insert the page into the free page queue. That is, a free page may be refilled in the free page queue through the operations shown in FIG. 8A.

Figure 8B:
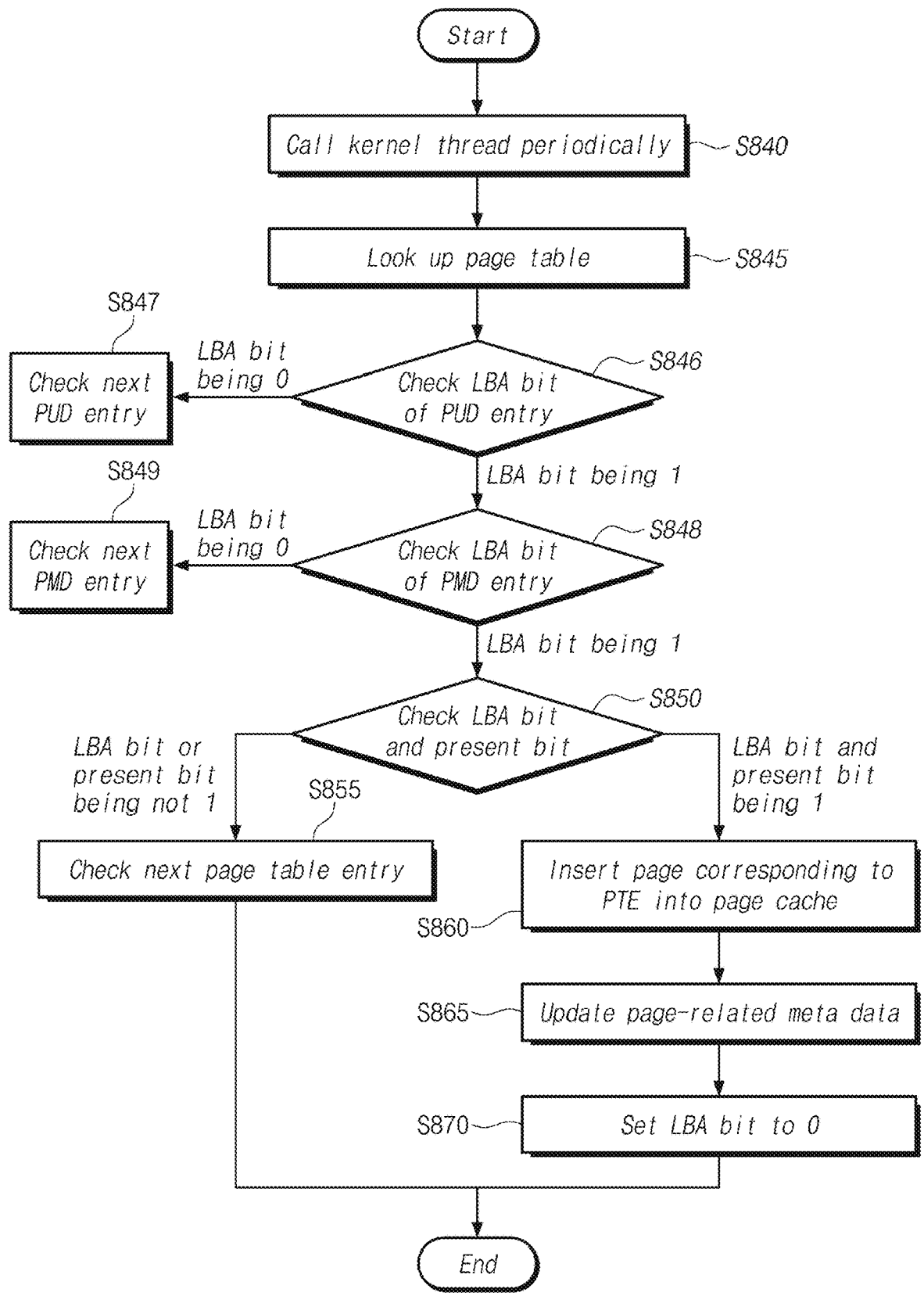
FIG. 8B is a diagram for describing a demand paging technique post-processing kernel thread according to an embodiment of the inventive concept.

FIG. 8B is a diagram for describing a demand paging technique post-processing kernel thread according to an embodiment of the inventive concept. According to an embodiment, the flowchart shown in FIG. 8B may be performed by the operating system illustrated in FIG. 12.

According to an embodiment, in operation S840, the operating system may periodically call a kernel thread, and in operation S845, the operating system may look up a page table. According to various embodiments, an LBA bit of the PUD entry and an LBA bit of the PMD entry may be checked in operation S846 and operation S848, respectively. As understood in operation S846 and operation S848, a next level of a page table may be looked up only when an LBA bit of a relevant entry is "1", and thus, the overhead due to the look-up of the page table may be greatly reduced. In operation S850, the operating system may check an LBA bit and a present bit of a page table entry.

According to an embodiment, when the LBA bit or the present bit is not "1", in operation S855, the operating system may check a next page table entry. According to various embodiments, when the LBA bit and the present bit is "1", in operation S860, the operating system may insert a page corresponding to the page table entry into a page cache or an LRU list.

According to an embodiment, in operation S865, a page-related meta data may be updated, and in operation S870, the operating system may set the LBA bit of the page table entry to "0".

Figure 9:
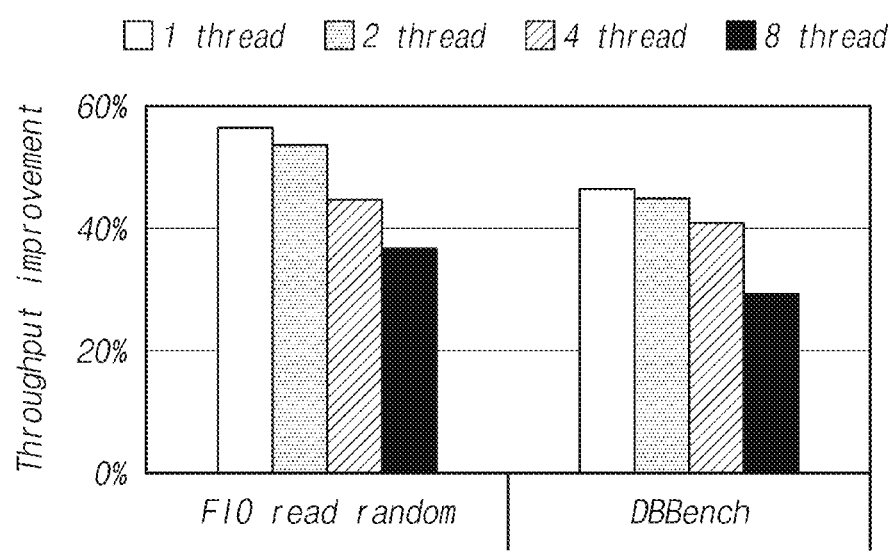
FIGS. 9 and 10 are graphs indicating the degree of throughput improvement according to the inventive concept, which is measured with respect to an SSD, compared to the related art.
Figure 10:
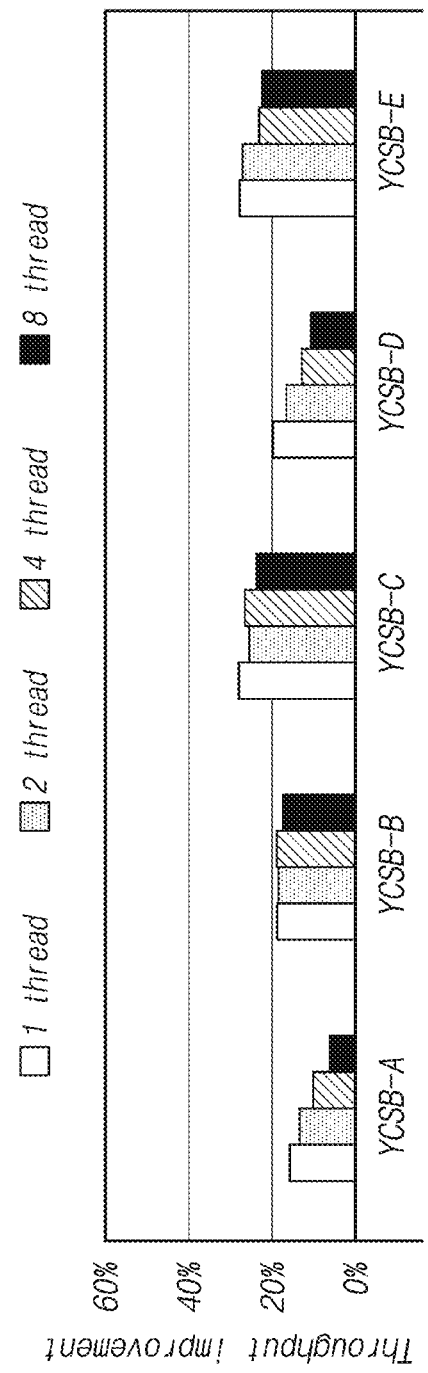

FIGS. 9 and 10 are graphs indicating the degree of throughput improvement according to the inventive concept, which is measured with respect to an SSD, compared to the related art. FIG. 9 is a graph illustrating the degree of throughput improvement associated with Flexible I/O Tester (FIO), RocksDB DBbench read random workloads. It may be confirmed from the graph of FIG. 9 that as the technique according to the inventive concept is applied, performance is improved as much as about 29.4% to 57.1% compared to the related art. Meanwhile, FIG. 10 is a graph illustrating the degree of throughput improvement in the case of performing an YCSB workload on RocksDB. It may be confirmed from the graph of FIG. 10 that the effect of throughput improvement is the greatest at an YCSB-C workload where the percentage of a read operation is the greatest. That is, it may be confirmed from the graph of FIG. 10 that the overall performance is improved as much as about 5.3% to 27.3%.

Figure 11:
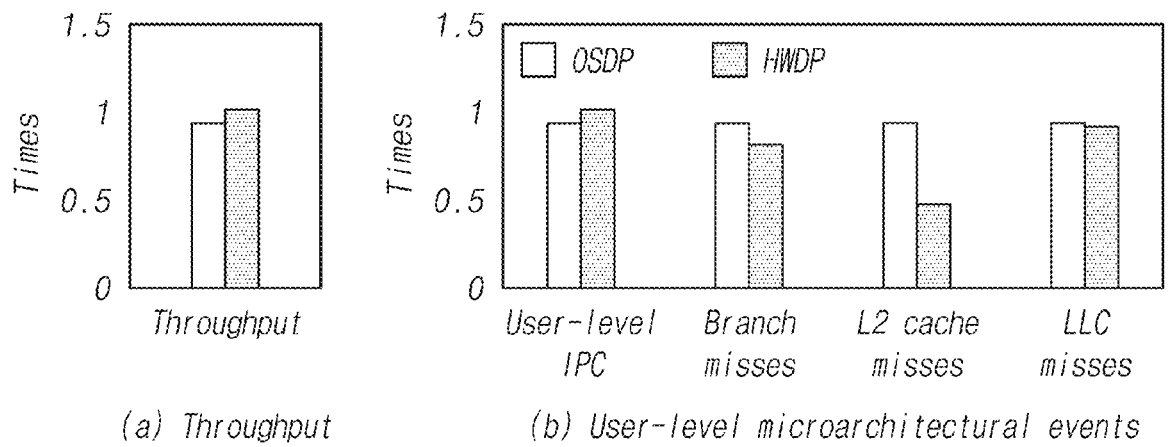
FIG. 11 is a graph illustrating throughput and resource pollution according to the inventive concept and the related art, which are measured with respect to an SSD.

FIG. 11 is a graph illustrating throughput and resource pollution according to the inventive concept and the related art, which are measured with respect to an SSD. In detail, FIG. 11 is a graph showing normal throughput and resource pollution associated with the YCSB-C workload, a graph marked by "OSDP" is associated with a conventional operating system based demand paging processing technique, and a graph marked by "HWDP" is associated with a hardware based demand paging processing technique according to the inventive concept. It may be confirmed from the graph of FIG. 11 that the number of times of a microarchitecture resource miss decreases. That is, it may be confirmed from the graph of FIG. 11 that pollution of a microarchitecture resource due to the context of the operating system is reduced through the technology according to the inventive concept.

Figure 12:
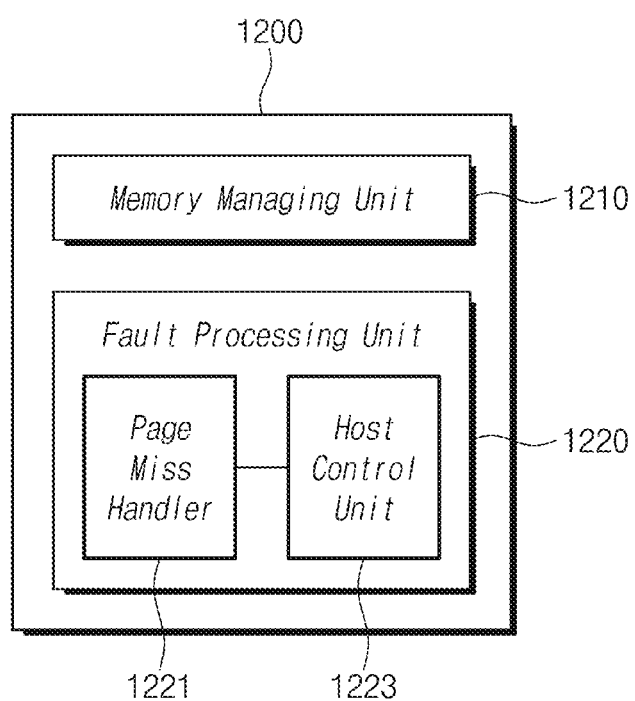
FIG. 12 is a diagram illustrating a structure of a processor according to an embodiment of the inventive concept.

FIG. 12 is a diagram illustrating a structure of a processor according to an embodiment of the inventive concept.

According to an embodiment, a processor 1200 may look up a page table and may check a present bit of a page table entry. The processor 1200 may include a memory management unit 1210 that checks a logical block address (LBA) bit of the page table entry when the present bit corresponds to a first value determined in advance and a fault processing unit 1220 that processes a page fault when the LBA bit corresponds to a second value determined in advance. Meanwhile, the processor 1200 according to the inventive concept may include a central processing unit (CPU) and a graphics processing unit (GPU).

According to an embodiment, the fault processing unit 1220 may include a page miss handler 1221 that receives information associated with a page fault, looks up page miss status holding registers (PMSHR) based on the information associated with the page fault, allocates a page for processing the page fault based on information stored in the PMSHR, updates the page table entry, and transfers a page fault processing completion message to the memory management unit 1210, and a host control unit 1223 that receives an I/O request from the page miss handler 1221, processes an I/O through a queue register, and transfers an I/O completion message to the page miss handler 1221.

According to an embodiment of the inventive concept, in the case of accessing data of a storage device through a virtual memory based on a processor, a delay time may decrease, and a response speed may become higher.

In addition, according to an embodiment of the inventive concept, a time taken to process demand paging may decrease. Also, as intervention of an operating system is markedly reduced in processing the demand paging, pollution of a microarchitecture resource due to the intervention of the operating system may decrease.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A method for processing a page fault by using a processor and an operating system, the method comprising:
performing demand paging depending on an application operation;
loading, at the processor, data on a memory in response to the demand paging; and
processing the page fault selectively by the operating system or by the processor, dependent on a result of checking bits of a page table entry,
wherein the loading of the data on the memory includes;
looking up, at a memory management unit constituting the processor, a page table;
checking a present bit of the page table entry;
when the present bit corresponds to a first value determined in advance, checking a logical block address (LBA) bit of the page table entry; and
when the LBA bit corresponds to a second value determined in advance, processing the page fault through a fault processing unit constituting the processor.

2. The method of claim 1, wherein the processing of the page fault includes:
transferring information associated with the page fault to a page miss handler constituting the fault processing unit;
looking up page miss status holding registers (PMSHR) based on the information associated with the page fault;
allocating a page for processing the page fault based on information stored in the PMSHR;
updating, at the page miss handler, the page table entry; and
transferring, at the page miss handler, a page fault processing completion message to a memory management unit.

3. The method of claim 2, further comprising:
after the allocating of the page for processing the page fault, transferring, at the page miss handler, an I/O request to a host control unit;
processing, at the host control unit, an I/O through a queue register; and
transferring, at the host control unit, an I/O completion message to the page miss handler.

4. The method of claim 3, further comprising:
snooping, at the host control unit, a head address of a completion queue with regard to the I/O request and checking whether to transfer the I/O completion message to the page miss handler.

5. The method of claim 1, wherein the page table entry includes information associated with the present bit, information associated with the LBA bit, information associated with a socket identifier (ID), information associated with a device ID, and information associated with a logical block address.

6. The method of claim 1, further comprising:
when the present bit corresponds to a third value determined in advance, returning a page frame number;
when the LBA bit corresponds to a fourth value determined in advance, calling an operating system page fault handler;
allocating a page from an operating system memory allocator;
inserting the page into a page cache; and
transferring an I/O request through a device driver and updating the page table entry upon I/O completion.

7. The method of claim 1, further comprising:
calling, at the operating system, a kernel thread periodically;
allocating, at an operating system memory allocator, a page;
performing direct memory access (DMA) mapping of the allocated page; and
refilling a free page by inserting the allocated page into a free page queue.

8. The method of claim 1, further comprising:
looking up, at the operating system, the page table periodically;

checking, at the operating system, an LBA bit of a page middle directory (PMD) entry and an LBA bit of aa page upper directory (PUD) entry;

checking, at the operating system, the LBA bit and the present bit of the page table entry;

inserting a page corresponding to the page table entry into a cache or a least recently used (LRU) list based on the LBA bit and the present bit; and updating page-related meta data.

9. A processor for processing a page fault, comprising:

a memory management unit configured to look up a page table and to check a present bit of a page table entry, wherein, when the present bit corresponds to first value determined in advance, the memory management unit checks a logical block address (LBA) bit of the page table entry; and a fault processing unit configured to process the page fault when the LBA bit corresponds to a second value determined in advance, wherein the fault processing unit includes a page miss handler configured to:

receive information associated with the page fault;

look up pane miss status holding registers (PMSHR) based on the information associated with the page fault;

allocate a gage for processing the page fault based on information stored in the PMSHR;

update the page table entry; and transfer a page fault processing completion message to a memory management unit.

10. The processor of claim 9, wherein the fault processing unit further includes a host control unit configured to:

receive an I/O request from the page miss handler;

process an I/O through a queue register, and transfer an I/O completion message to the page miss handler.

11. The processor of claim 10, wherein the host control unit snoops a head address of a completion queue with regard to the I/O request and checks whether to transfer the I/O completion message to the page miss handler.

12. The processor of claim 9, wherein the page table entry includes information associated with the present bit, information associated with the LBA bit, information associated with a socket identifier (ID), information associated with a device ID, and information associated with a logical block address.

* * * * *